(12) United States Patent
Koetje et al.

(10) Patent No.: US 12,433,270 B2
(45) Date of Patent: Oct. 7, 2025

(54) METHODS AND APPARATUS FOR REMOVING AND BLEEDING FISH FROM A GILL NET

(71) Applicants: Rick Koetje, Tacoma, WA (US); Andrew Blackstock, Bonney Lake, WA (US)

(72) Inventors: Rick Koetje, Tacoma, WA (US); Andrew Blackstock, Bonney Lake, WA (US)

( * ) Notice: Subject to any disclaimer, the term of this patent is extended or adjusted under 35 U.S.C. 154(b) by 318 days.

(21) Appl. No.: 18/208,183

(22) Filed: Jun. 9, 2023

(65) Prior Publication Data
US 2024/0407345 A1    Dec. 12, 2024

(51) Int. Cl.
*A01K 75/00*    (2006.01)
*B26D 5/12*    (2006.01)

(52) U.S. Cl.
CPC ............... *A01K 75/00* (2013.01); *B26D 5/12* (2013.01)

(58) Field of Classification Search
CPC ...... A01K 75/00; A22C 25/142; A22C 25/08; A22C 25/00; B26D 5/12; B26D 1/04; B26D 1/06; B26D 3/08; B26D 3/10; B26D 5/007; B26D 5/20; B26D 2210/02; B25J 9/042; B25J 19/023; B25J 11/0045; B25J 9/0093; B26F 1/02; B26F 1/04; B26F 1/14; A22B 5/0017; A22B 5/0029; A22B 5/0041; A22B 5/04
USPC ............................................. 30/346
See application file for complete search history.

(56) References Cited

U.S. PATENT DOCUMENTS

| | | | |
|---|---|---|---|
| 539,679 A | 5/1895 | Gagnon et al. | |
| 3,364,517 A | 1/1968 | Bartels | |
| 4,347,680 A | 9/1982 | Kaestner | |
| 6,450,707 B1 * | 9/2002 | Spencer | G03B 17/22 242/527 |
| 7,048,961 B2 | 5/2006 | Knauf | |
| 7,174,668 B2 | 2/2007 | Locklear | |
| 8,092,283 B2 | 1/2012 | Hansen | |
| 8,104,413 B1 * | 1/2012 | Rodriguez | D05B 69/28 112/296 |

(Continued)

FOREIGN PATENT DOCUMENTS

| | | |
|---|---|---|
| JP | 2009284909 A | 12/2009 |
| WO | 2007006035 A1 | 1/2007 |

*Primary Examiner* — Adam J Eiseman
*Assistant Examiner* — Peter Howell Tilton
(74) *Attorney, Agent, or Firm* — Sierra IP Law, PC; Mark D. Miller

(57) ABSTRACT

The present invention provides methods and apparatus for efficiently removing fish from gill nets and consistently initiating the bleeding process by providing electronic units having a flat outer surface with a sensor thereon, and a piston-actuated blade mounted behind an opening in the surface adjacent to the sensor. Electronics are provided to receive signals from the sensor and to operate the piston. In operation, a fish entangled in a gill net is brought near the sensor along the flat surface such that the fish gill is near the blade opening. Upon sensing the fish, the piston is actuated causing the blade to briefly extend through the opening in the surface in order to simultaneously cut the net and also punch into the gill of the fish, and then quickly retract. This action cuts the fish free from the net with minimal damage to the net, and also initiates the bleeding process.

17 Claims, 14 Drawing Sheets

(56) References Cited

U.S. PATENT DOCUMENTS

2012/0294991 A1* 11/2012 Knorr ...................... B26D 9/00
  99/489
2022/0022473 A1    1/2022  Takagi
2022/0287285 A1    9/2022  Bajer et al.

* cited by examiner

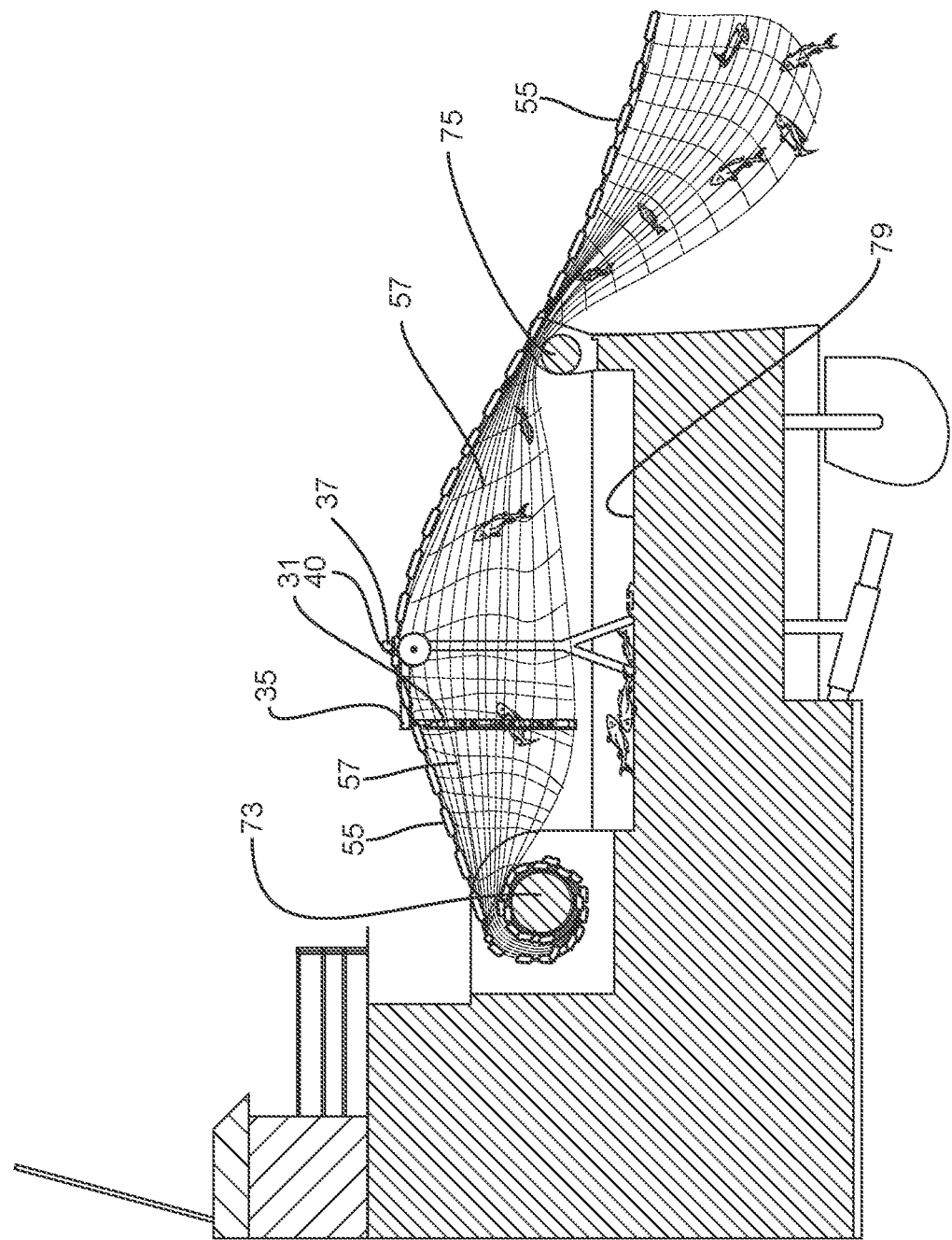

METHODS AND APPARATUS FOR REMOVING AND BLEEDING FISH FROM A GILL NET

FIELD OF THE INVENTION

The present invention relates generally to the field of commercial and recreational fishing, and more particularly, to methods and apparatus for efficiently removing fish from gill nets and initiating the bleeding process.

BACKGROUND OF THE INVENTION

Gill net fishing is a common method employed in both commercial and recreational fishing due to its efficiency and simplicity. In a typical deployment, a wall of netting is suspended in the water by floats, with weights attached at the lower end, creating a barrier for the fish. Fish are caught when they try to swim through the net, with their gills getting stuck in the netting, hence the name gill net fishing. The cord or rope supporting the upper end of the net and the floats is known as the cork line, and the cord or rope at the lower end of the net is known as the lead line.

Several challenges are associated with gill net fishing. One such challenge is the efficient removal of fish from the nets. The process is labor-intensive and time-consuming, requiring fishermen to manually extract the fish from the net. This process involves dislodging the fish gill from the net, which may require turning the fish around in the net, pulling the fish through the net, cutting the net, or combinations of all three of these steps, in order to remove the fish from the net.

Another challenge involves the bleeding of the caught fish. This process helps preserve the quality of the fish meat, increasing its shelf-life and market value. It is preferred to begin the bleeding process of fish as soon after they are caught as possible, so that they may be promptly counted and moved into cold storage below deck. The process involves requires inserting a blade at a precise location behind the gill of the fish to start bleeding. Ordinarily, the bleeding process is initiated while the fish is being removed from the net, where the fish may be readily accessed and cut, since it is far more difficult and time consuming to sift through slippery fish lying on the deck of a boat to identify those that have not been cut. This is a physically demanding and time-consuming manual process, and if not done correctly may fail to initiate bleeding, or may cause damage to the fish meat reducing its market value.

Faced with the time pressure of removing fish as the net is pulled from the water, a fisherman may wind up cutting large holes in the net to remove fish, and may not have time to initiate the bleeding process, and/or may damage the fish in the removal or bleeding process.

Previous attempts have been made to address these challenges. For instance, various types of dehooking and detangling devices have been developed to facilitate the removal of fish from nets. However, these devices often lack the efficiency and ease of use needed for large-scale operations. Moreover, they often fail to address the issue of bleeding the fish in a swift and efficient manner.

As a result, there is a need for methods and apparatus that can efficiently remove fish from gill nets and consistently initiate the bleeding process. This would reduce the manual labor involved, consistently produce high-quality fish meat, and thereby increase the efficiency and profitability of gill net fishing operations.

SUMMARY OF THE INVENTION

The present invention provides methods and apparatus for efficiently removing fish from gill nets and consistently initiating the bleeding process. Embodiments of the apparatus of the invention include electronic units having a flat outer surface with a sensor thereon, and a piston-actuated blade mounted behind an opening in the surface adjacent to the sensor. Electronics are provided to receive signals from the sensor and to operate the piston, which may be pneumatic, electronic or hydraulic. In operation, a fish entangled in a gill net is brought near the sensor along the flat surface such that the fish gill is near the blade opening. Upon sensing the fish, the piston is actuated causing the blade to briefly extend through the opening in the surface in order to simultaneously cut the net and also punch into the gill of the fish, and then quickly retract. This action cuts the fish free from the net with minimal damage to the net (usually only one thread or strand is cut), and also initiates the bleeding process.

In some embodiments, the sensor may be located above the blade opening. In these embodiments, when the head of a fish caught in the net is brought up near the sensor, this will cause a gill of the fish to be positioned next to the blade opening. When the sensor detects the presence of the fish, as signal is sent to actuate the piston and extend the blade. In some embodiments, there may be a slight delay before the piston causes the blade to punch into the fish. The delay may be anywhere between one tenth of a second to an entire second, and allows the operator a moment to get fingers and hands out of the way before the blade comes out.

In some embodiments, the blade may have an L-shaped cross section, and the opening in the surface through which the blade extends may have a corresponding shape. The opening may also have brushes and/or a rubberized material around the area where the knife extends to maintain a seal. This allows only the blade to extend through, and helps prevent unwanted water, blood and/or debris to be brought back through the opening. In some embodiments, the sensor and blade opening are provided above and below each other, along an axis on the surface. In these embodiments, when an L-shaped blade is provided below the sensor, one of the long sides of the blade may be provided at the bottom of the opening and may have an orientation that is perpendicular to the axis (horizontal). The other side of the L-shaped blade will then extend up in a vertical direction. In these embodiments, the axis between the sensor and the opening is generally vertical and the orientation of the long side of the blade is generally horizontal. This positioning helps guide the blade when it is extended so that the long side penetrate the fish above its collar without damaging valuable fish meat below the collar, and the other side of the blade cuts into the gill to start the bleeding process. Other shapes of blades may be used including without limitation blades having a cross section in the shape of a "V", "T", or backwards "L".

It is to be appreciated that in different embodiments the knife blade may be provided in different lengths. The blade should be long enough to extend through the opening and into a fish when pushed out by the actuator piston. It is to be appreciated that if the piston is farther from the opening, a longer blade will be needed to reach the opening and then extend through it. The length of the blade will also depend on the type of fish that are being caught. Larger fish will require a longer blade to extend far enough to cut the gill, whereas smaller fish will not need a long blade which could cause damage to smaller fish. In some embodiments, the length of the blade may have a relationship to the size of the openings in the gill net. If the net openings are large, then the net will only catch large fish, and a longer blade will be required. For example, and without limitation, a large blade may extend three inches (3") from the surface of the unit. On the other hand, if the net openings are small, then the net will catch smaller fish, and a shorter blade will be appropriate. For example, and without limitation, a shorter blade may extend one and one-half inches (1.5") from the surface of the unit. It is to be appreciated that in different embodiments the blade may extend out as much as five inches (5") or as little as one inch (1") from the surface.

In some embodiments, the actuator piston may be operated using air, using for example and limitation an air cylinder, a pneumatic cylinder, an air piston, a pneumatic piston or the like. In these embodiments, a source of pressurized air may or may not be needed. In other embodiments, the piston may be electronically operated using, for example and without limitation, a solenoid, a linear actuator, an electric piston, an electric motor, or the like. In some embodiments, the sensor may be optical and may be triggered by a reflection from the shiny scales of the fish, although other sensors may be used including without limitation, motion, light, vicinity, or any other suitable sensor.

It is to be appreciated that in some embodiments, a plurality of sensor-blade combinations or units may be provided in a single housing. Multiple units may all be deployed in a common housing or may be provided in separate housings. Providing a multiplicity of sensor-blade combinations gives fisherman different options for cutting fish free from different areas of the gill net. For example and without limitation, three units may be provided in a single apparatus allowing a different unit to be used with fish caught at the top of the net, at the middle of the net, and at the bottom of the net as it is brought onto the boat. It is to be appreciated that in embodiments where multiple units are provided in a single housing, knife blades of the same length or of different lengths may be provided for each of the units.

In most embodiments, the electronic components of the apparatus (such as sensors, pistons, timers, circuitry, power supply, and the like) are provided inside a closable housing for protection from a potentially harsh exterior environment. The housing should be as water tight as possible allowing for the blade(s) to extend and retract during operation. In some embodiments a movable door or shutter may be provided at each blade opening which covers the opening at most times, and moves aside only briefly when the knife blade is extended out and then back in.

Electronic controls may be provided for operating embodiments of the present invention. These may be used to adjust such things as: the sensitivity of the sensor for detecting the presence of a fish, the distance that the blade extends when actuated, the amount of delay (if any) between sensing the presence of a fish and actuating the piston, lighting, audio signals, signals for malfunctions, etc. The electronic control may be enclosed within the housing with the sensors and blades, or it may be provided at a different location on the boat, and communicate via wires or wirelessly to the sensor-blade units. A power supply such as a battery may be provided inside the housing, or power be provided from an external power source.

In some embodiments, a housing holding the components of the invention may be movably suspended from a rail or cross beam above the boat deck, such that the sensor(s) and blade opening(s) dangle from above and may be positioned adjacent to the net as it is brought in. The support for the housing may be rotatable for optimum positioning, and the arm that supports a rotatable the pulley for the gill net cork line may be used to support the housing of the present invention.

In one aspect, an embodiment of the present includes an apparatus for cutting a fish free from a gill net comprising a base having a flat exterior surface, a sensor on the exterior surface for detecting the presence of a fish, an opening in said exterior surface adjacent to the sensor, a support attached to an opposite interior surface of the base adjacent to the opening, a piston provided on the support, a knife blade movably attached to the piston for extension through and retraction from the opening, and an electronic control in communication with said sensor and said piston. In some aspects, when the sensor of the apparatus detects an object, it causes the control to briefly activate the piston causing the blade to briefly extend through the opening and then retract from the opening. In some aspects, the detection of an object by the sensor causes the control to activate the piston after a pre-determined time delay, and the time delay may be between one half second and one second. In some aspects, the knife blade has an L-shaped cross section. In some aspects, the knife blade has a cross section having a shape selected form the group of: an "L" shape, a reverse "L" shape, a sideways "V" shape, and an inverted 'T' shape, and the opening has a shape corresponding to the selected knife blade shape. In some aspects, the knife blade may extend out between one inch (1") and three inches (3"). In some aspects, the sensor is selected from the group of optical, light, and motion. In some aspects, the sensor is capable of detecting shiny surface features of a fish. In some aspects, the piston is selected from the group of electronic, pneumatic and hydraulic and may be a solenoid. In some aspects, a sealable housing is provided for enclosing one or more of the apparatus. In some aspects, the housing includes a plurality of upper mounts for attaching the housing to a support arm. In some aspects, the support arm also supports a roller for receiving the cork line of a gill net. In some aspects, the housing has an upper edge with an arcuate shape, and a plurality of mounts may be provided on this upper edge for attaching the housing to a support arm. In some aspects, the apparatus may include at least one counterweight.

In other aspects, embodiments of the invention may include a method of removing fish from a gill net comprising the steps of first bringing a head of a fish entangled in a gill net next to a sensor on an exterior surface of a unit wherein the sensor is in electronic communication with a control and wherein the control is also in communication with a piston, such that when the presence of the fish head is detected by the sensor, a signal is sent to the control which thereafter activates the piston resulting in a blade being briefly extended out from an opening below the sensor; second holding the fish along the surface such that a gill of the fish is adjacent to the surface opening when the blade is extended; and third allowing the blade to cut through the net in order to free the fish from the net, and also pierce the fish gill to bleed the fish. Other aspects include the additional step of adjusting the position of the unit so that it is adjacent to an area on a fishing vessel where the gill net is retrieved. Other aspects include providing a time delay of up to one second between detection of the fish by the sensor and activation of the piston.

Further aspects and embodiments will be apparent to those having skill in the art from the description and disclosure provided herein.

It is an object of the present invention to provide methods and apparatus for rapidly and efficiently removing fish from gill nets with minimal damages to the fish meat and to the net.

It is an object of the present invention to provide methods and apparatus for rapidly and consistently initiating the fish bleeding process as fish are removed from a gill net.

It is an object of the present invention to provide methods and apparatus for speeding up the process of bleeding and removing fish from gill nets while maintaining high quality of marketable fish meat.

It is an object of the present invention to provide methods and apparatus for of bleeding and removing fish from gill nets that minimizes damage to the nets, making them more available for future use.

It is an object of the present invention to provide a portable apparatus for rapidly and efficiently removing fish from gill nets that may be easily deployed, removed, accessed and stowed on a variety of fishing vessels.

The above-described objects, advantages, and features of the invention, together with the organization and manner of operation thereof, will become apparent from the following detailed description when taken in conjunction with the accompanying drawings, wherein like elements have like numerals throughout the several drawings described herein. Further benefits and other advantages of the present invention will become readily apparent from the detailed description of the preferred embodiments.

BRIEF DESCRIPTION OF THE DRAWINGS

FIG. 5B is a side sectional view of the rear of a boat where another embodiment of the present invention has been deployed.

DETAILED DESCRIPTION

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention. In the following disclosure, specific details are given to provide a thorough understanding of the invention. However, it will be apparent to one skilled in the art that the present invention may be practiced without all of the specific details provided.

Figure 2:
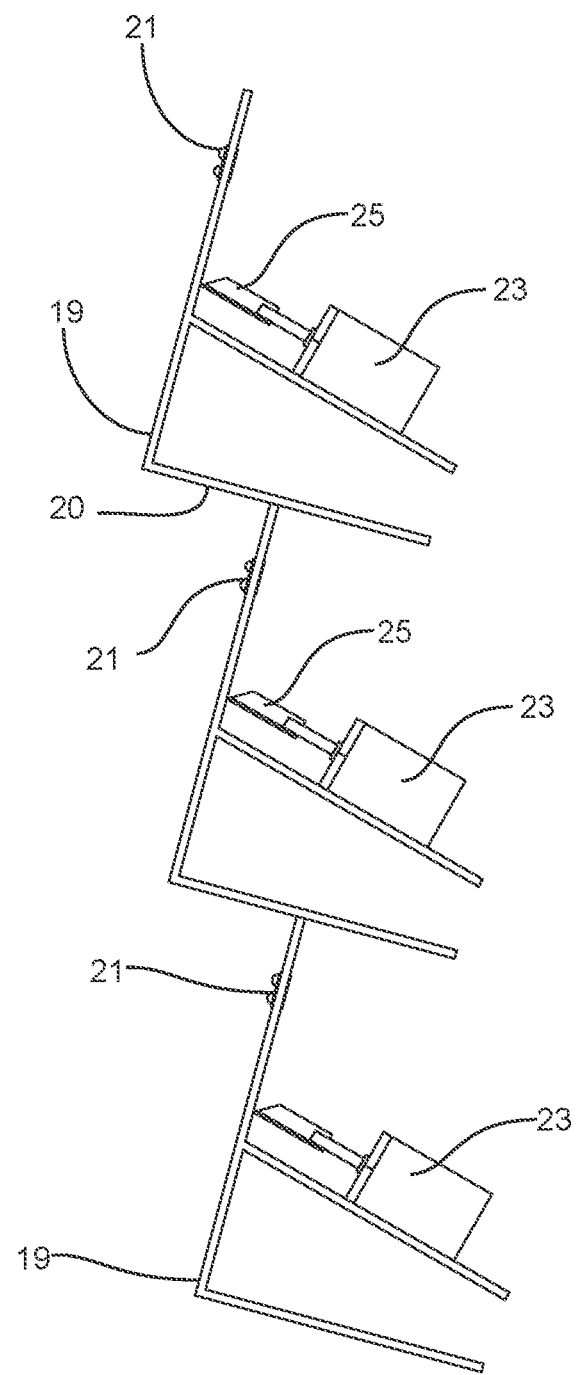
FIG. 2 is a side sectional view of a portion of an embodiment of the present invention without a housing.
Figure 3:
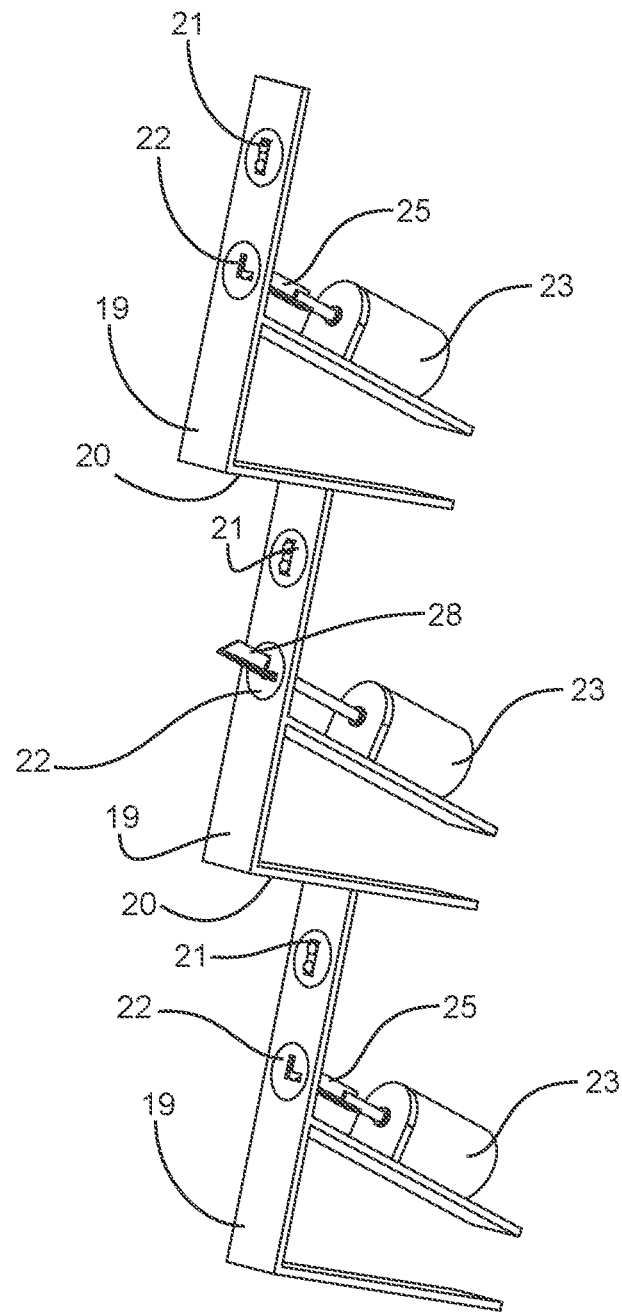
FIG. 3 is a perspective sectional view of a portion of an embodiment of the present invention without a housing.
Figure 8:
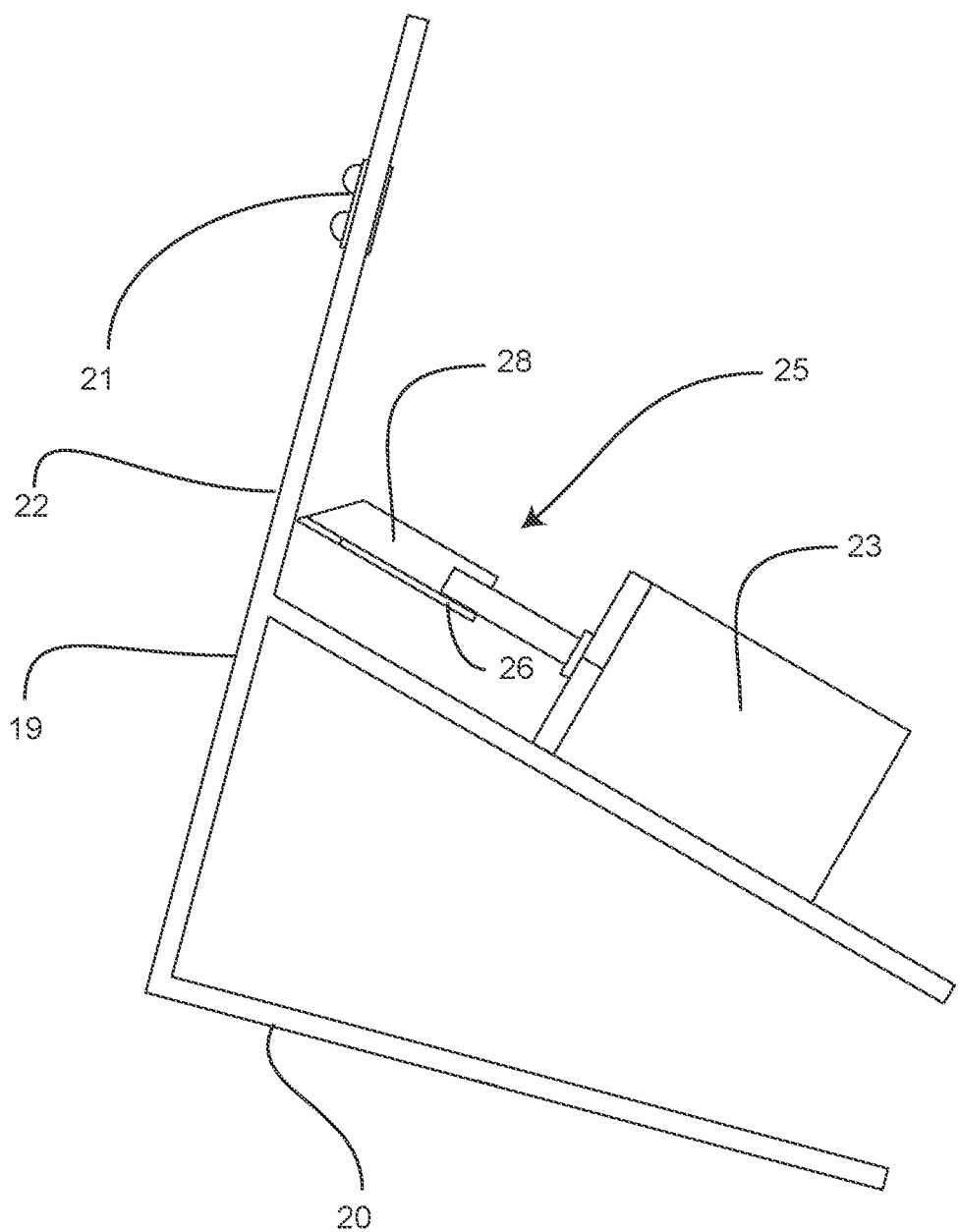
FIG. 8 is a detailed view of the components of a single electronic unit of an embodiment of the present invention.

Referring to FIGS. 2-3 and 8, it is seen that the exemplary embodiment illustrates three units attached in a staggered format together. A single unit 30 is shown in FIG. 8, and includes a flat surface 19 for supporting an outwardly-facing sensor 21 that is mounted above an opening 22 through which a blade 25 may be extended and retracted. Each sensor 21 may be without limitation optical, sonic, motion, light, or other suitable sensor. Each unit 30 also includes an actuator piston 23 that may be electronic, pneumatic, hydraulic, or have other suitable activation. An extendable and retractable blade 25 is provided with each piston 23 such that actuation of the piston extends the blade through opening 22, as shown in the middle unit of FIG. 3; and deactivation of the piston retracts the blade as shown in the upper and lower units of FIG. 3. It is to be appreciated that the shape of opening 22 may be the same as the shape of blade 25 (such as the "L" shape illustrated in FIG. 3) so as to minimize the opportunity for bringing outside contaminants into housing 31. It is to be appreciated that although three units are shown attached together in FIGS. 2-3, that any suitable number of units, from as few as one to as many as six, may be deployed within a single housing.

Figure 10:
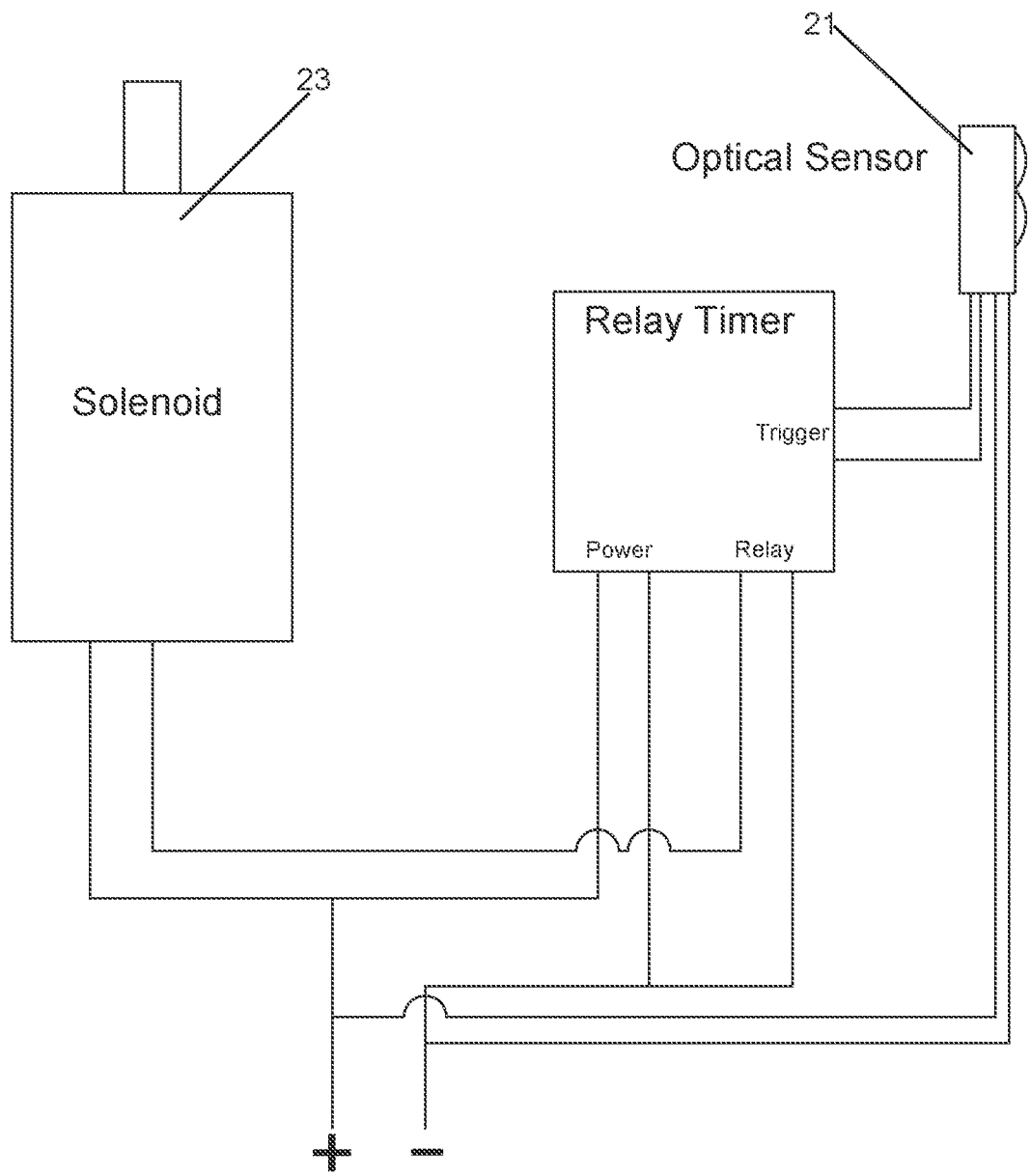
FIG. 10 is a schematic view of an embodiment of a circuit for an embodiment of the present invention.

Each sensor 21 and piston 23 is in electronic communication with a control that receives a signal from the sensor 21 when a fish or other object is detected, and sends a signal to the associated piston 23 to briefly extend the blade 25 in order to cut the net and puncture a fish. The control may include an adjustable timer 24 for adjusting the length of delay, if any, between detection of a fish and actuation of the piston. Referring to the exemplary schematic shown in FIG. 10, it is seen in this embodiment, a signal from the sensor 21 is sent to a relay timer 24 which may cause a delay before power is provided to the actuator 23 (which in this embodiment is a solenoid), causing the knife blade 25 to extend out. Relay 24 may also determine the amount of time before blade 25 is retracted back.

In the exemplary embodiment illustrated in FIGS. 2-3, it is seen that the staggered format of attachment of the units 30 separates the units from each other, and provides an upper surface 20 that may act as a stop for orienting the position of a fish and keeping it next to a particular unit. As shown in the detail of FIG. 8, the illustrated knife blade 25 has an L-shaped cross section, in which a lower edge 26 of the blade is horizontal, and an upper edge 28 of the blade is vertical. This orientation allows the horizontal edge 26 to pierce the fish above the collar, thereby avoiding damage to the meat of the fish, and allows the vertical edge 28 to pierce the gill of the fish to initiate the bleeding process. It is to be appreciated that in other embodiments, the knife 25 may be a single ordinary blade, or it may have a cross-section in the shape of a backwards-L, or in the shape of an upside down "T", or in the shape of a sideways "V", or other suitable shapes, and accomplish the same function. The flat (horizontal) bottom of the blade adjacent to a perpendicular (vertical) blade helps orient the blade to enter above the fish collar and prevent cutting into the fish meat, while also cutting the gill.

Figure 4:
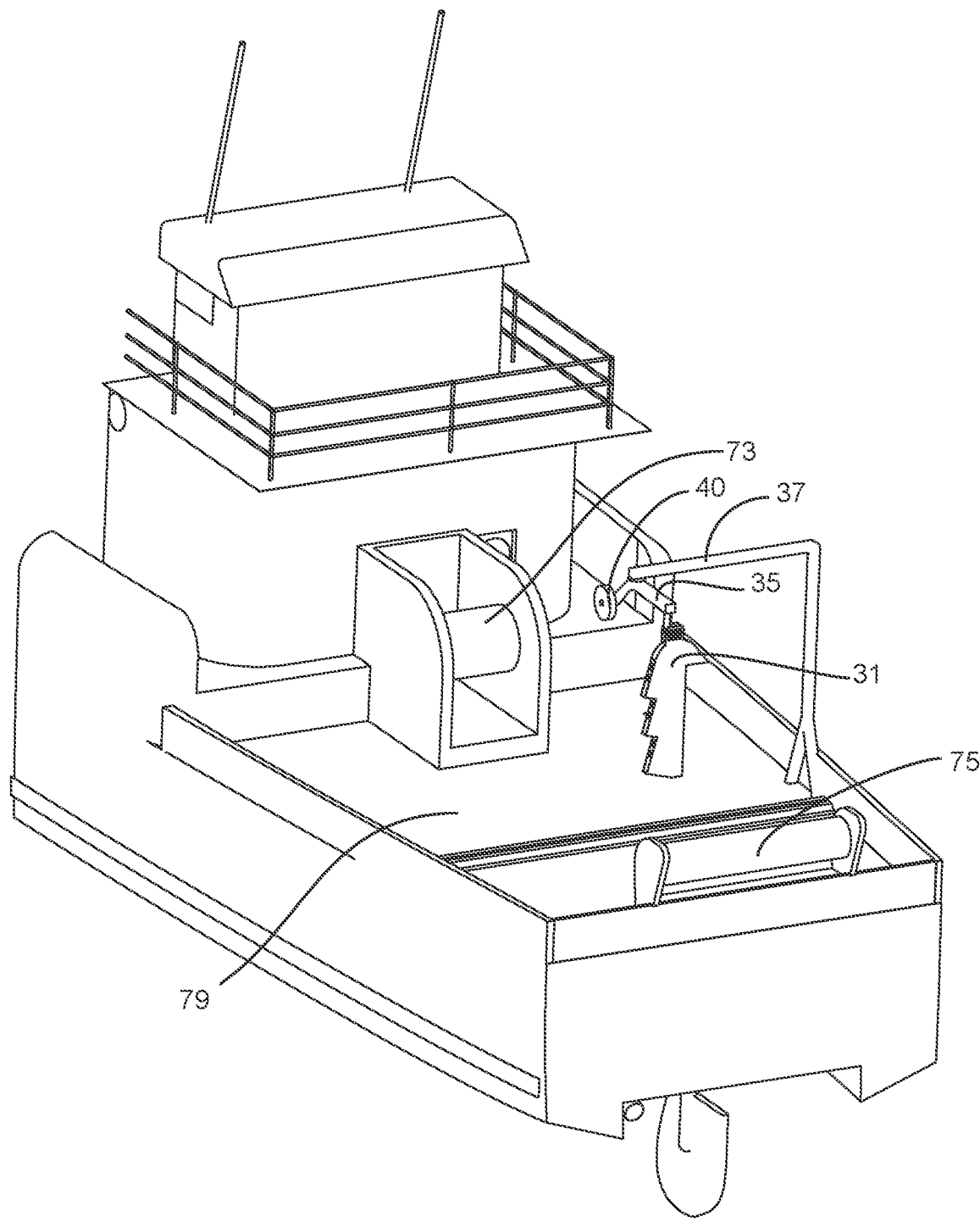
FIG. 4 is a perspective environmental view of the rear (stern) of a boat where an embodiment of the present invention has been deployed.

Embodiments of the invention may be deployed at the stern of a fishing vessel above the area where a gill net 57 is brought aboard, as shown in FIGS. 4-5. In a typical operation, the gill net 57 is pulled on board using a large motorized spool or drum 73. As the gill net 57 is brought aboard, it first encounters a power roller 75 at the very stern of the boat which guides the net into the boat. The net then crosses an area 79 where fishermen may disentangle fish from the net. Finally, the net is wound up on the drum 73.

Figure 6A:
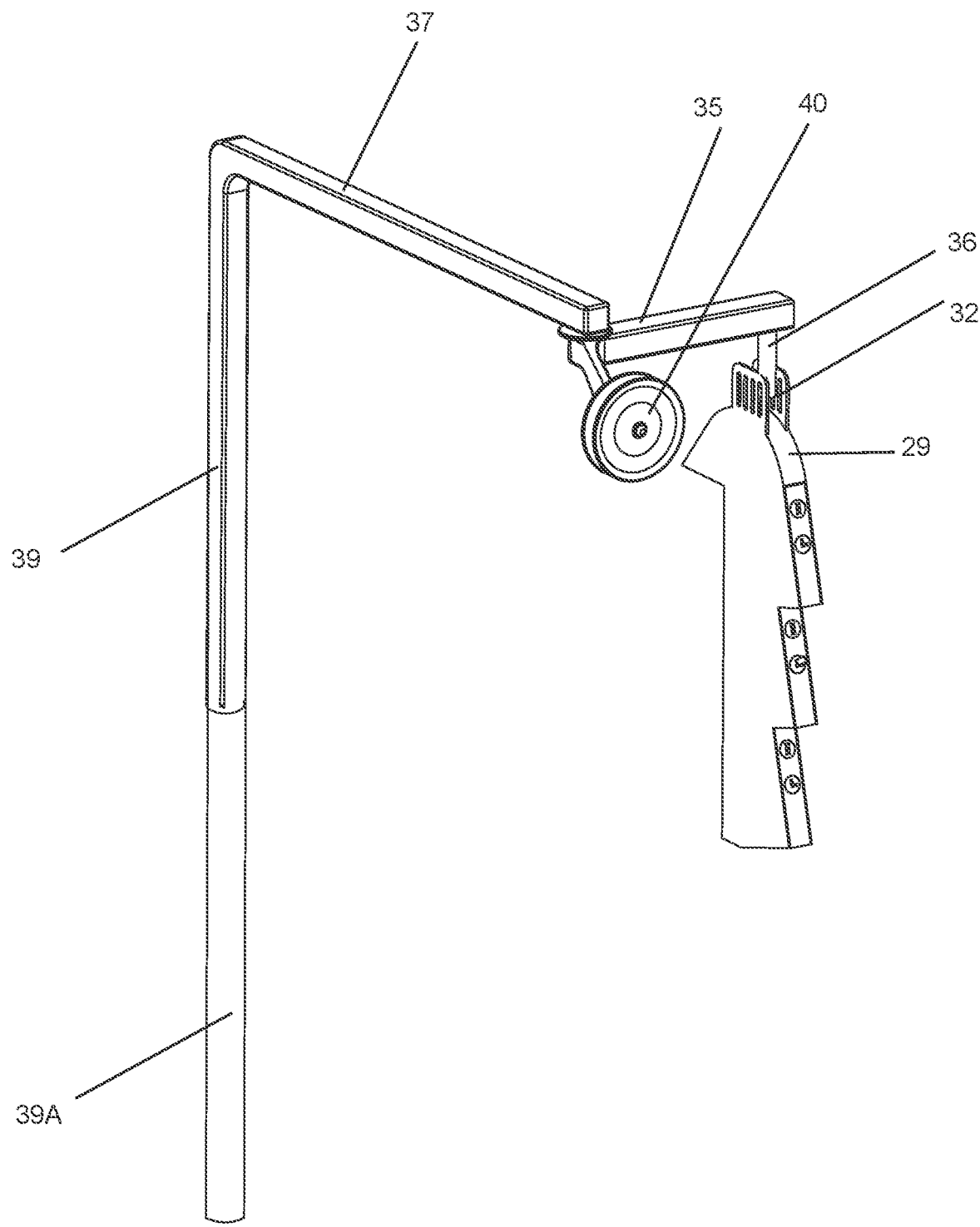
FIG. 6A is a perspective environmental view of an embodiment of the present invention with an exemplary support structure.
Figure 6B:
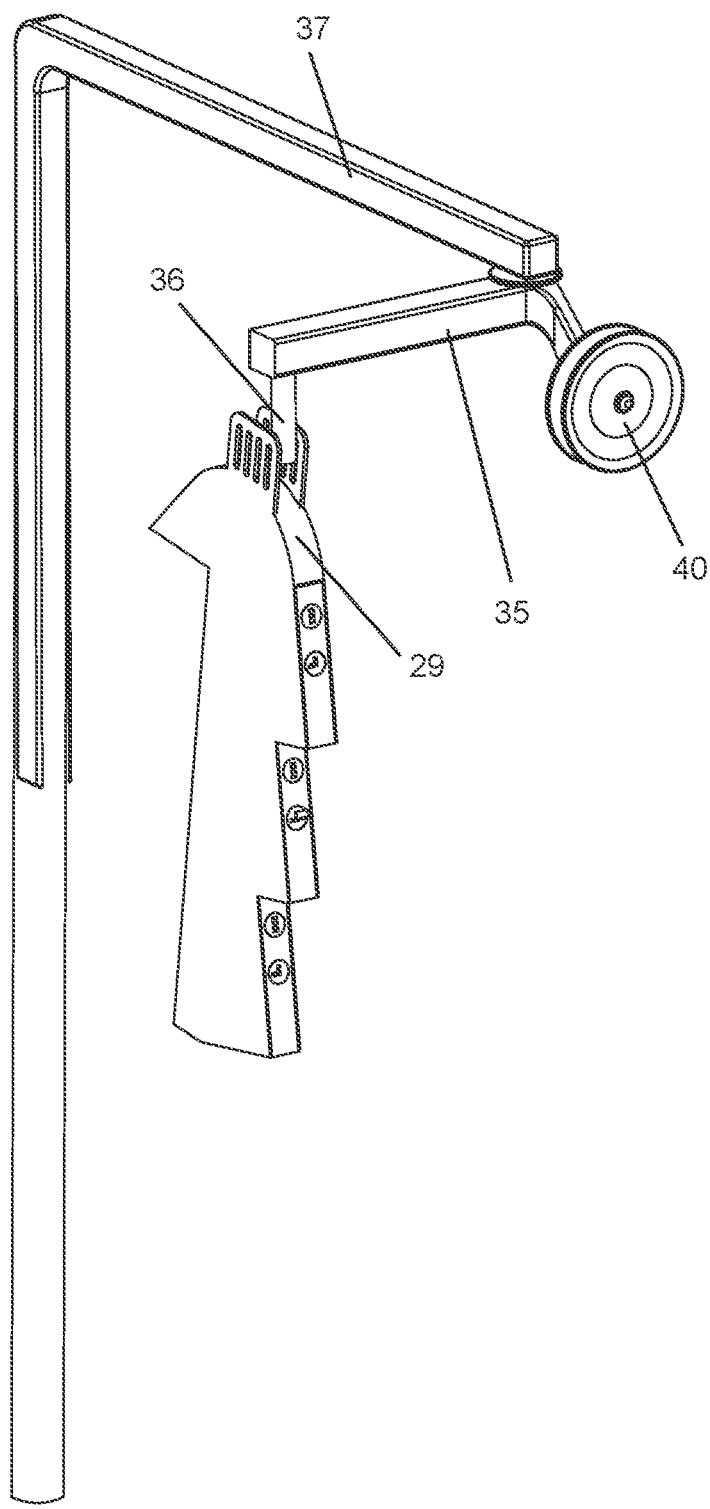
FIG. 6B is a perspective environmental view of another embodiment of the present invention with an exemplary support structure.
Figure 7A:
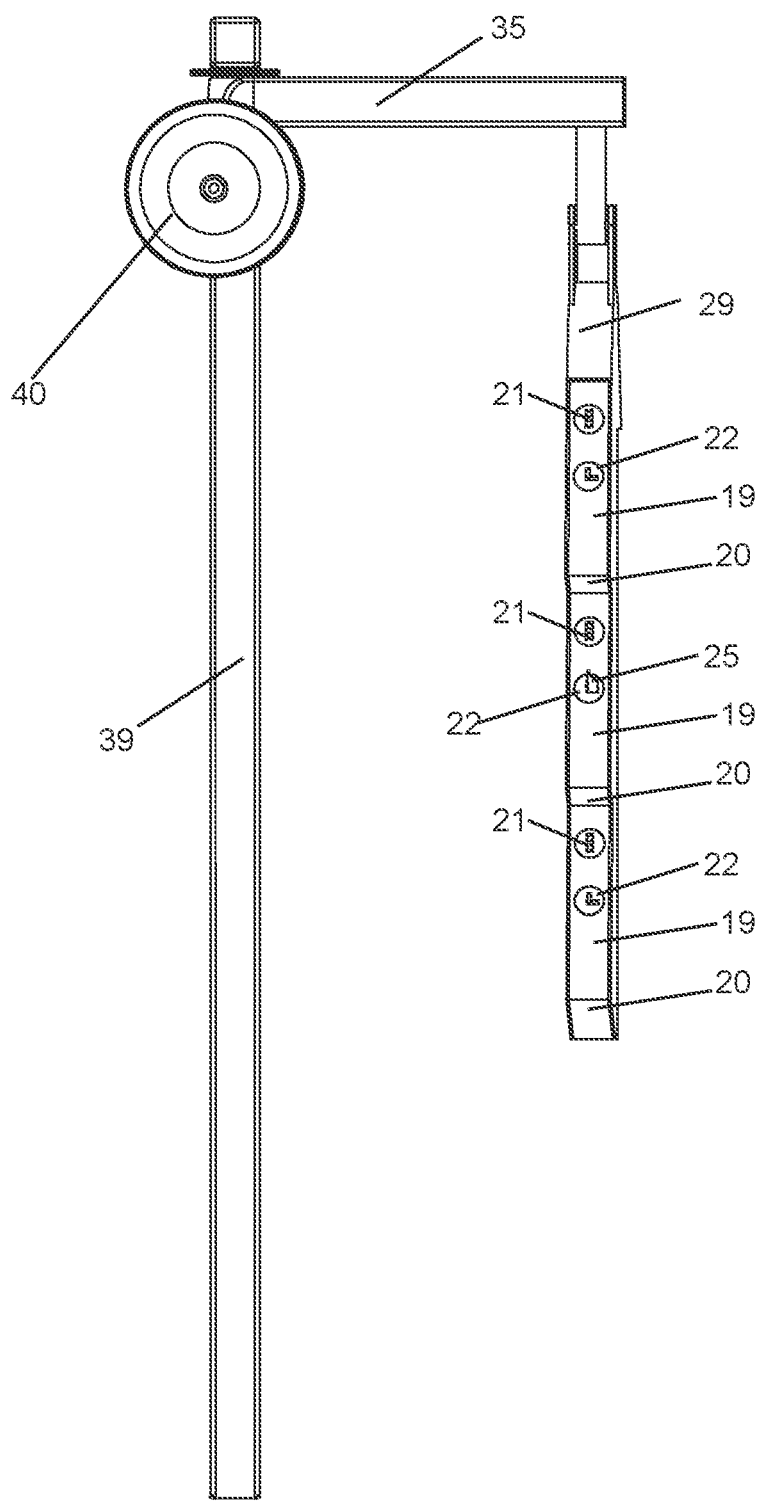
FIG. 7A is a side view of the embodiment of FIG. 6A.
Figure 7B:
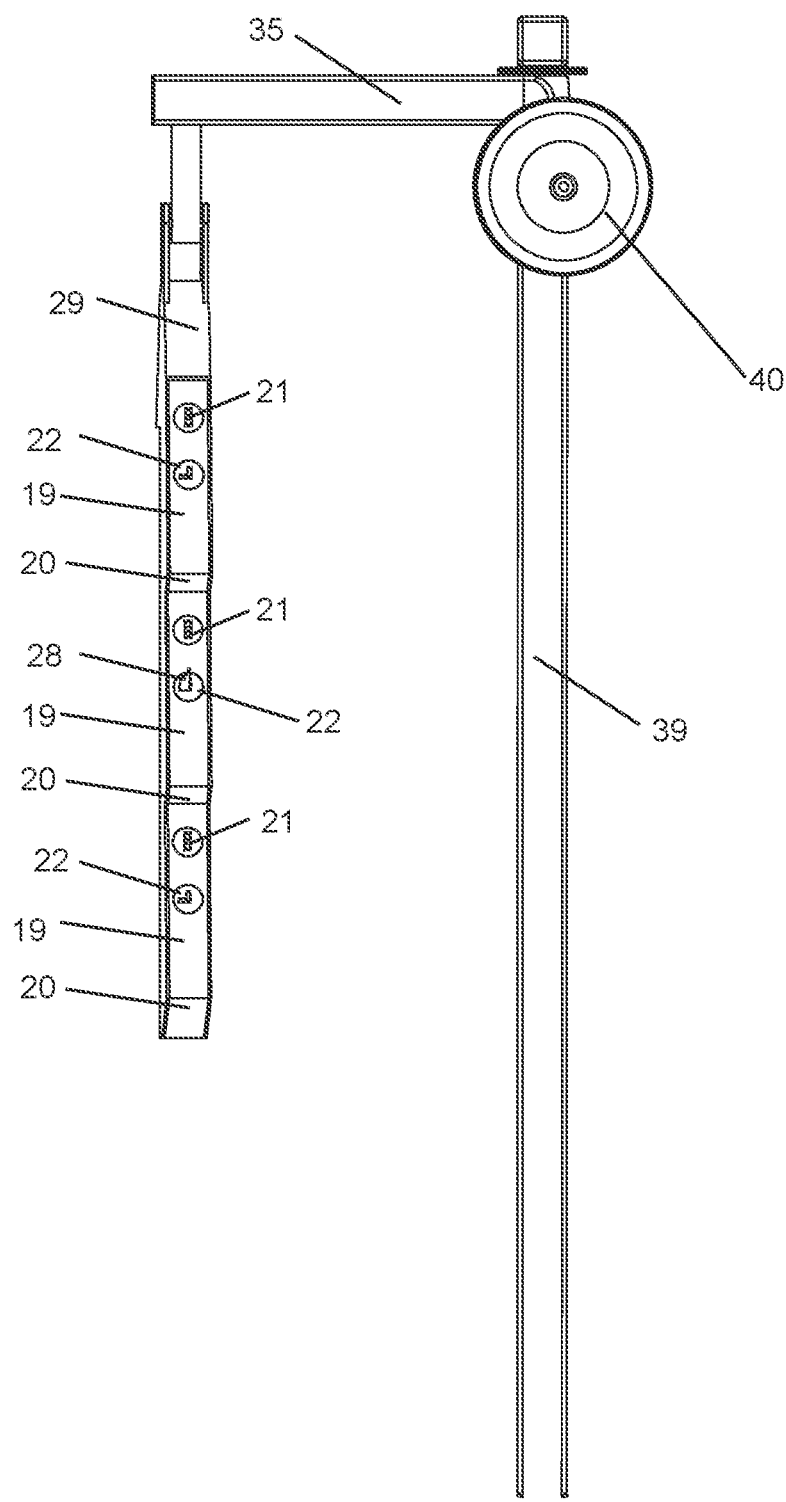
FIG. 7B is a side view of the embodiment of FIG. 6B.

Referring to FIGS. 1, 4, 4A and 9, it is seen that in some embodiments, the housing 31 containing one or more units 30 of the present invention is designed to hang from a generally horizontally oriented cross member 35. Housing 31 should be sealed when closed in order to keep out water, debris, fish parts or other contaminants to prevent damage to the interior electronics. In some embodiments, cross-member 35 is pivotally attached to a support arm 37 which extends out from a vertical support pillar 39. A plate 42 may be provided at this pivot. In some embodiments, pillar 39 may be rotatable, and may be rounded or have a rounded base 39A as shown in FIGS. 6A and 6B, so that it may be removably mounted by inserting it into a hole provided in either the port or starboard rail/gunwale of a vessel. In other embodiments, the hole for receiving support pillar 39 may be provided adjacent to the drum used to retrieve the gill net 57 from the water. In other embodiments, dual pillars may be provided, one on the starboard side and one on the port side, with arm 37 connecting the pillars, and cross member 35 pivotally attached to arm 37.

Figure 1:
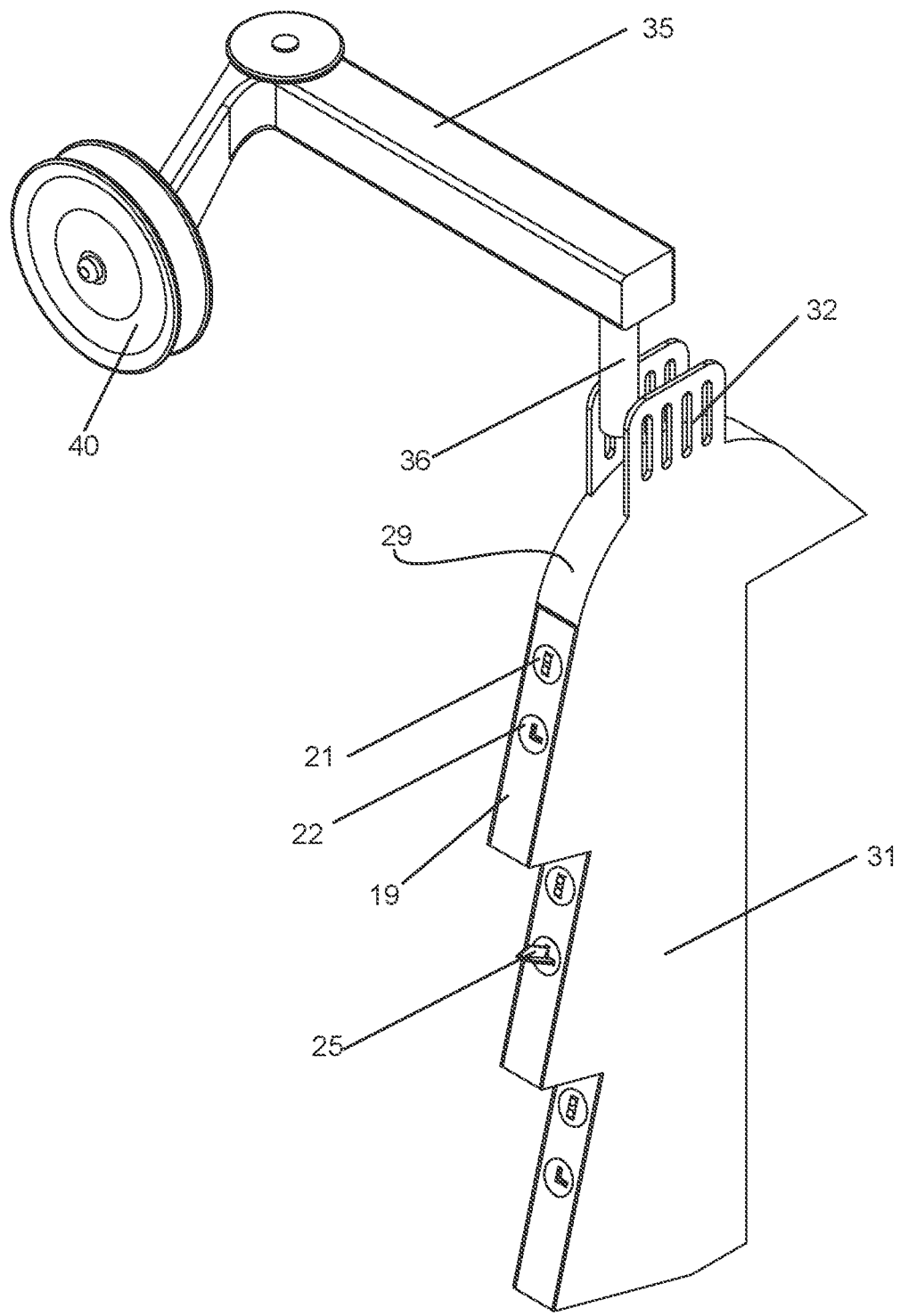
FIG. 1 is a perspective view of an embodiment of the present invention.
Figure 9:
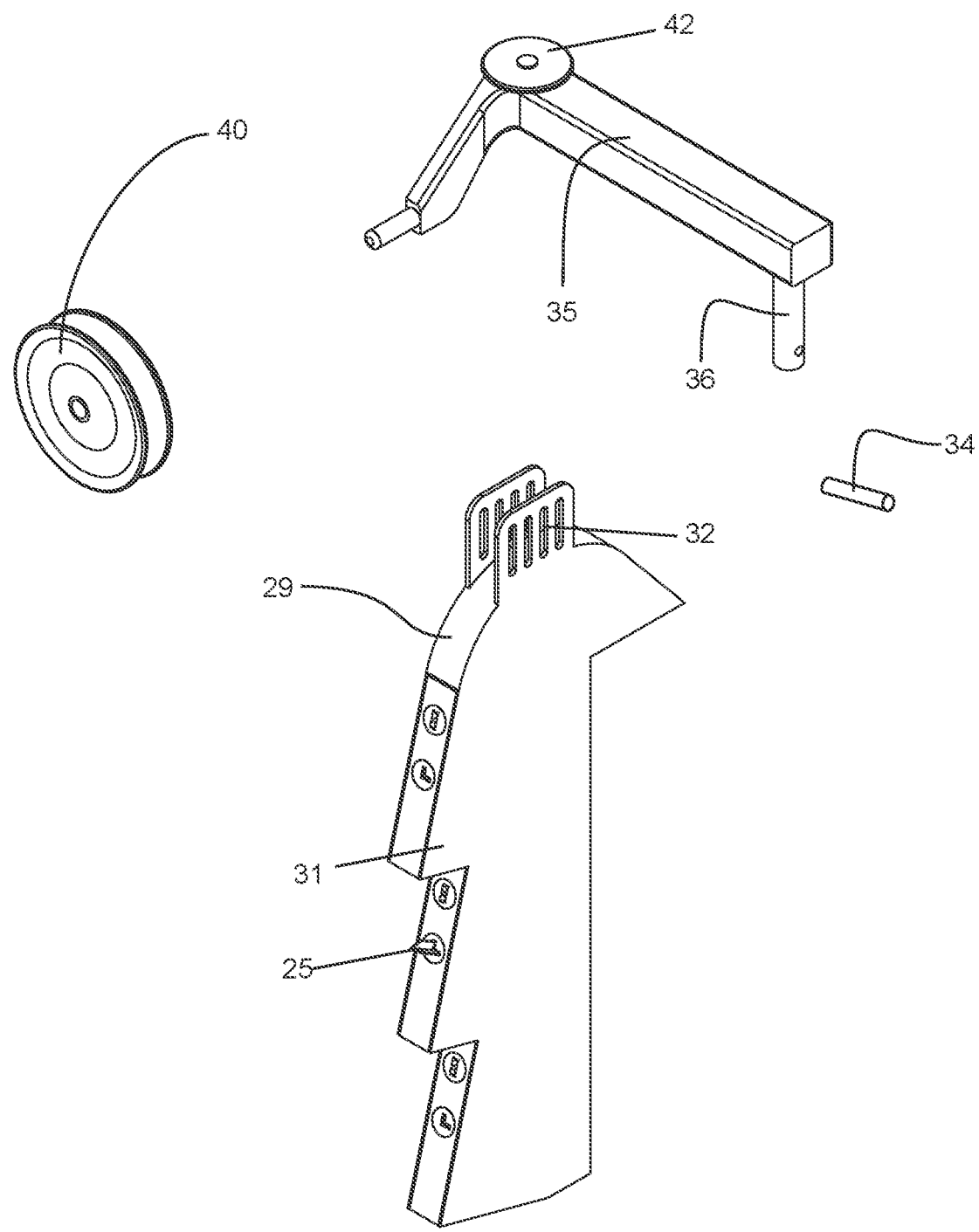
FIG. 9 is an exploded view of an embodiment of the present invention.

As shown in the detail of FIGS. 1 and 9, it is seen that different mounts 32 may be provided at different positions on the top of housing 31. One of these mounts 32 may be selected for attachment of housing 31 to cross member 35 which may use a universal joint 36, and/or may be engaged using a cotter pin 34. The selection of the mount depends on the amount of tilt or angle desired for the units 30 in the housing. For example and without limitation, if a central mount "B" is selected, housing 31 may hang at a nearly vertical orientation; if a mount "A" at one end of the housing 31 is selected, it may hang at an angle of up to thirty degrees (30°) forward; and if a mount "C" at an opposite end of the housing 31 is selected, it may hang at an angle of up to thirty degrees (30°) backward. Different mounts will provide different amounts of angle, and a large number of mounts may be provided to provide a wide variety of angles. In some embodiments, the upper surface 29 of housing 31 may be flat. However, in most embodiments such as that shown in FIGS. 1 and 9, upper surface 29, upon which mounts 32 are provided, may be arcuate so as to increase the effect of using different mounts 32.

It is to be appreciated that different amounts of angle may be selected using different mounts between the opposite ends, and/or by providing different amounts of arc in surface 29. The angle selected for hanging housing 31 may depend on such things as the height of the net 57, the position of the roller pulley 40, the height of the fishermen removing fish from the net, whether there is a strong wind blowing the net one direction or another, and other factors that may vary from catch to catch. It is desirable to position the housing and electronic units 30 in such a way as to result the most efficient removal of fish from the net.

In some embodiments, counterweights of different sizes may be provided inside or outside of housing 31 to increase or decrease the hang angle achieved. For example and without limitation, adding a large counterweight may cause the most extreme angle available to change from thirty degrees (30°) without the counterweight to forty degrees (40°) with the counterweight. It is to be appreciated that other differences in the angle of housing 31 may be achieved with different sized counterweights working in conjunction with the mount 32 selected and the arc of surface 29. It is also to be appreciated that an initial counterweight may be provided to cause housing 31 to hang vertically when attached to a central mount 32.

Figure 5A:
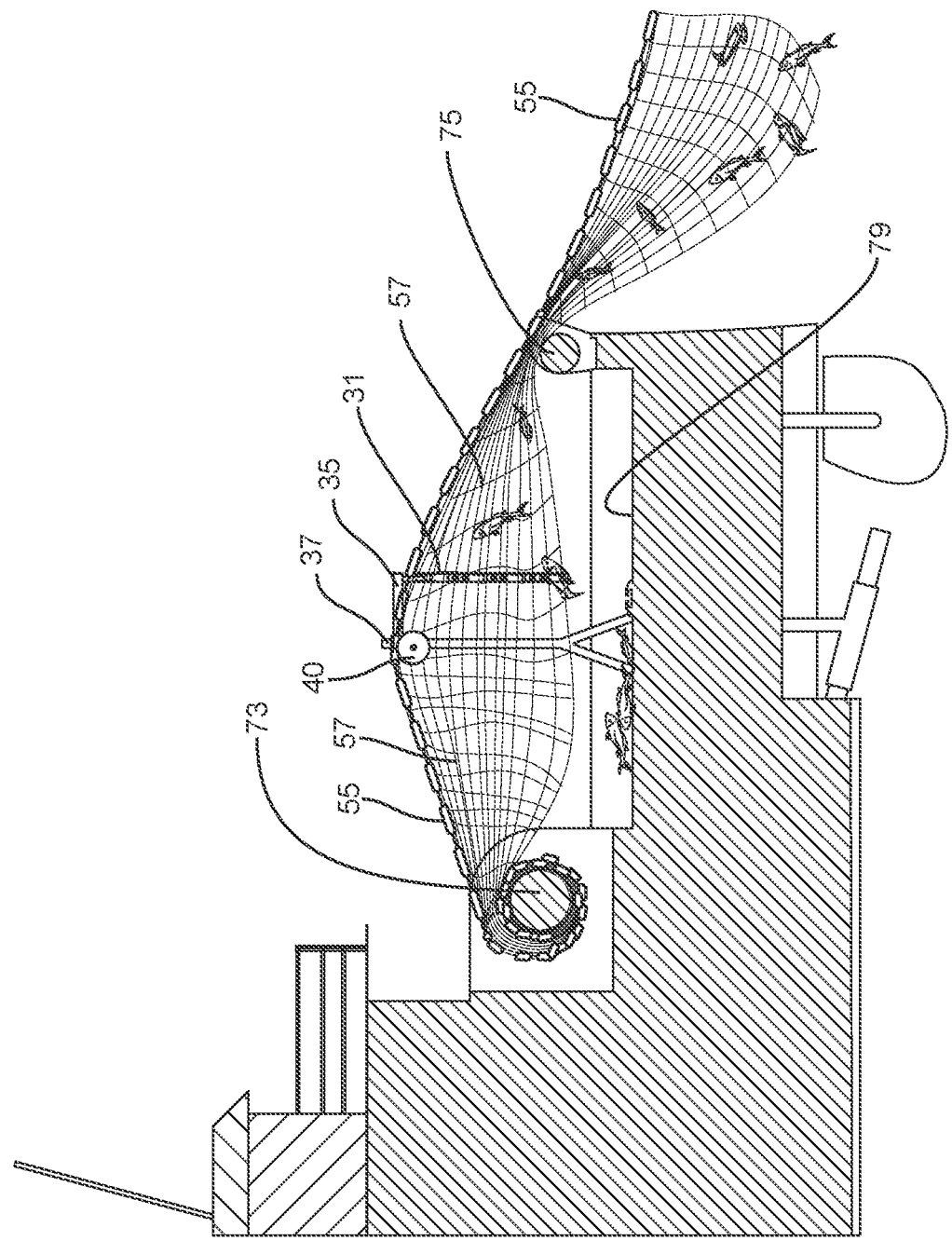
FIG. 5A is a side sectional view of the rear of a boat where an embodiment of the present invention has been deployed.
Figure 11:
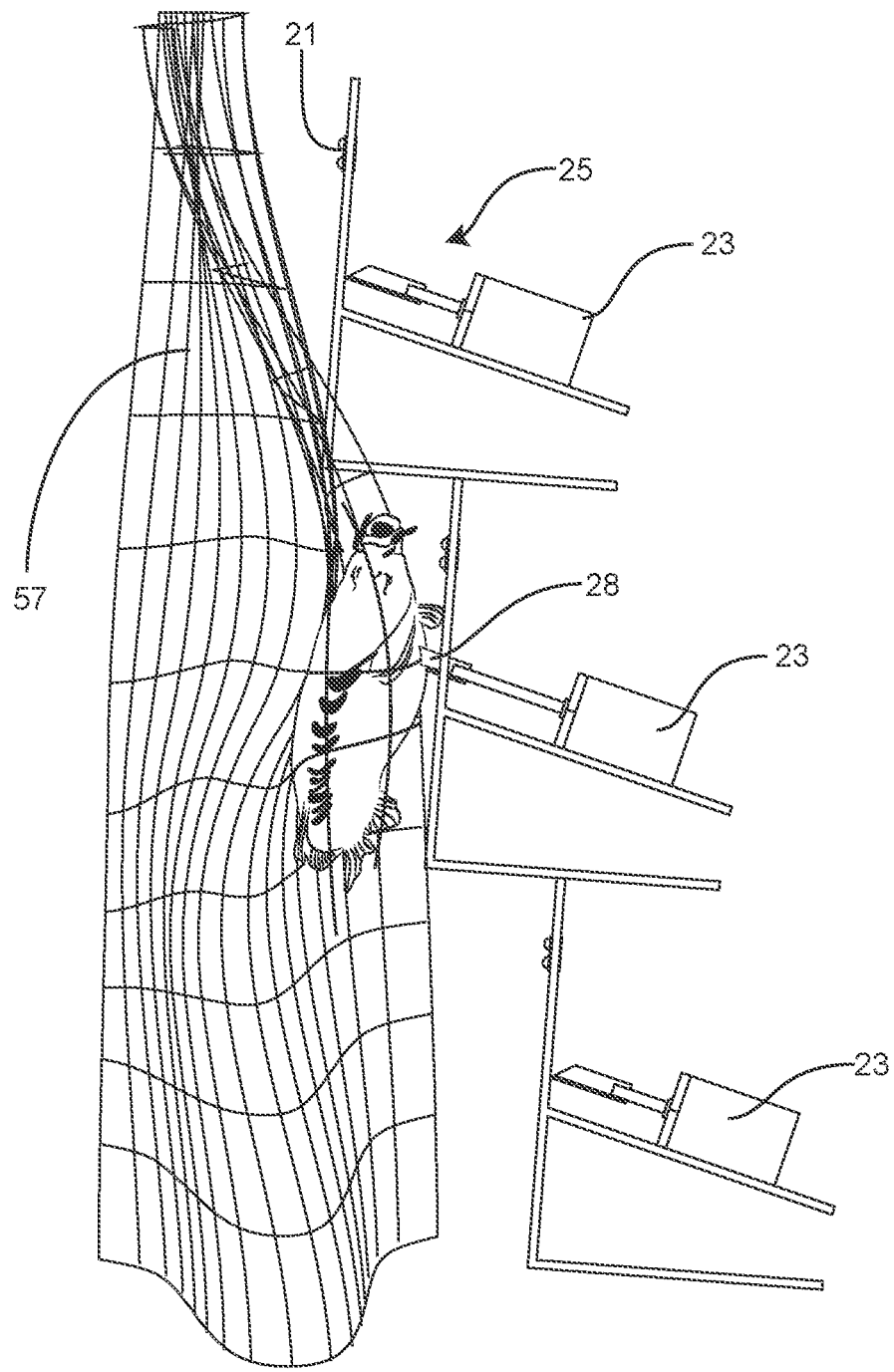
FIG. 11 is an environmental view showing a fish in proximity with an embodiment of the invention.

In some embodiments, cross member 35 may also include a lower arm 33 which extends downward and supports a rotatable wheel or pulley 40. One side of pulley 40 is rotatably attached to arm 41, making it possible to guide the cork line 55 of the gill net 57 over pulley 40 as the net with entangled fish is brought on board. The housing 31 may be located forward or aft of the pulley 40, and pulley 40 should be positioned higher than the top unit in the housing 31 so that as the cork line 55 is brought over pulley 40, the net 57 is opened up in front of the housing 31 for removal of fish, as shown in FIGS. 5A and 5B. It is expected that the more common position for pulley 40 will be aft of the housing as shown in FIG. 5B to open up the net before it reaches the housing 31 and fishermen working with it. This positioning makes the electronic unit(s) 30 in the housing available adjacent to the net 57 containing entangled fish, such that as the net 57 is brought in, each entangled fish may be manipulated and moved near one of the units 30 in order cut the fish free and start the bleeding process, as shown in FIG. 11.

In some embodiments, a power supply may be provided inside housing 31. However, in other embodiments, power may be provided from an external source. Power cables may extend up through the insides of, or around the outsides of pillar 39, arm 37 and cross member 35 leading to a connector 68. Connector 68 may be attached to a complementary connector 69 extending out from housing 31. A water tight seal should be provided in housing 31 where at the cable or connector location. In some embodiments, a slip ring may be used between arm 37 and cross member 35 to shield the wiring inside the support members while providing uninterrupted power.

In use, a housing 31 containing one or more units 30 of the present invention is moved adjacent to an area 79 where a gill net 57 containing fish will be brought onto a vessel, as shown in FIGS. 5A and 5B. This may be accomplished by rotating a pillar 39 so that support arm 37 and cross member 35 extend over area 79, with support arm 37 generally perpendicular to the rails/gunwales on the sides of the boat. Movably mounted cross member 35 may then be rotated to a desired orientation, usually one that is generally parallel to the rails/gunwales. A locking mechanism may be provided to hold pillar 39 in place after this rotation. A different locking mechanism may be provided to hold cross member 35 in position on arm 37. Rotatable pulley 40 is provided on cross member 35 to receive the cork line 55 of the gill net 57, and housing 31 is attached to cross member 35 using a selected mount 32 that provides a desired angle for positioning of the unit(s) 30 in housing 31. Housing 31 may be connected to a power source.

As the net 57 is reeled in, the cork line 55 is directed over pulley 40, opening up the net. Fisherman on one or both sides of the net may then grab the entangled fish and/or the netting adjacent to the fish to manipulate the head of each fish near one of the sensors 21 of one of the units 30, as shown in FIG. 11. This causes the fish body to be positioned adjacent to the knife blade opening 22 of the unit. When the fish head is detected, the knife blade 25 is rapidly extended out, cutting the fish free from the net and punching into the fish to cut the gill and start the bleeding process. The blade is then retracted. Depending on settings chosen by the fisherman, there may or may not be a delay between sensing the fish and actuation of the blade. Once the fish is cut free, it is collected with other fish and stored for transport. Meanwhile, the net 57 is rolled up onto drum 73 for another use in a future deployment.

After use, the embodiment may be stowed by rotating pillar 39 approximately ninety degrees (90°) forward or aft, to position support arm 37 generally parallel to the rails/gunwales on the sides of the boat. Cross member 35 may also be rotated so that it is generally parallel to the rails/gunwales on the sides of the boat. Housing 31 may then be disconnected and removed from cross member 35 and stored elsewhere. Housing 31 may be opened for cleaning and service. Pillar 39, support arm 37 and cross member 35 may then be secured using ropes, ties, or other suitable locking mechanisms. When not in use, pillar 39 (along with arms 37 and 35) may be removed from the opening in rail/gunwale and stored elsewhere until needed again.

It is to be understood that variations, modifications, and permutations of embodiments of the present invention, and uses thereof, may be made without departing from the scope of the invention. It is also to be understood that the present invention is not limited by the specific embodiments, descriptions, illustrations, or combinations of either components or steps disclosed herein. The embodiments were chosen and described in order to best explain the principles of the invention and its practical application, thereby enabling others skilled in the art to best utilize the invention and various embodiments with various modifications as are suited to the particular use contemplated. Although reference has been made to the accompanying figures, it is to be appreciated that these figures are exemplary and are not meant to limit the scope of the invention. It is intended that the scope of the invention be defined by the claims appended hereto and their equivalents.

What is claimed is:

1. An apparatus for cutting a fish free from a gill net comprising:
   a. a base having a flat exterior surface;
   b. a sensor on said exterior surface for detecting the presence of a fish;
   c. an opening in said exterior surface adjacent to said sensor;
   d. a support attached to an opposite interior surface of said base adjacent to said opening;
   e. a piston provided on said support;
   f. a knife blade movably attached to said piston for extension through and retraction from said opening; and
   g. an electronic control in communication with said sensor and said piston.

2. The apparatus of claim 1 wherein detection of an object by said sensor causes said control to briefly activate said piston causing said blade to briefly extend through said opening and then retract from said opening.

3. The apparatus of claim 1 wherein detection of an object by said sensor causes said control to activate said piston after a pre-determined time delay.

4. The apparatus of claim 1 wherein said knife blade has an L-shaped cross section.

5. The apparatus of claim 1 wherein said knife blade has a cross section having a shape selected form the group of: an "L" shape, a reverse "L" shape, a sideways "V" shape, and an inverted "T" shape, and said opening has a shape corresponding to the selected knife blade shape.

6. The apparatus of claim 1 wherein said sensor is selected from the group of optical, light, and motion.

7. The apparatus of claim 1 wherein said sensor is capable of detecting shiny surface features of a fish.

8. The apparatus of claim 1 wherein said piston is selected from the group of electronic, pneumatic and hydraulic.

9. The apparatus of claim 1 wherein said piston is a solenoid.

10. The apparatus of claim 3 wherein said time delay is between one half second and one second.

11. The apparatus of claim 1 further comprising a sealable housing for enclosing said control, piston and blade.

12. The apparatus of claim 1 wherein said housing further comprises a plurality of upper mounts for attaching said housing to a support arm.

13. The apparatus of claim 12 wherein said support arm also supports a roller for receiving the cork line of a gill net.

14. The apparatus of claim 1 wherein an upper edge of said housing has an arcuate shape.

15. The apparatus of claim 14 wherein said housing further comprises a plurality of mounts on said upper edge for attaching said housing to a support arm.

16. The apparatus of claim 1 further comprising at least one counterweight.

17. The apparatus of claim 1 wherein said knife blade extends through said opening in an amount of between about one inch (1") and about three inches (3").

* * * * *